June 24, 1924.

H. W. GRAU

Re. 15,864

PORTABLE DRILL ATTACHMENT

Original Filed Sept. 15, 1921

Inventor,

Henry W. Grau.

By Robert Watson

Attorney

Reissued June 24, 1924. Re. 15,864

UNITED STATES PATENT OFFICE.

HENRY WALTER GRAU, OF BALTIMORE, MARYLAND.

PORTABLE-DRILL ATTACHMENT.

Original No. 1,477,439, dated December 11, 1923, Serial No. 500,743, filed September 15, 1921. Application for reissue filed May 8, 1924. Serial No. 711,930.

*To all whom it may concern:*

Be it known that I, HENRY W. GRAU, a citizen of the United States, residing at Baltimore, in the State of Maryland, have invented certain new and useful Improvements in Portable-Drill Attachments, of which the following is a specification.

This invention relates to attachments for portable drills whereby the drill may be readily handled and applied to the work by the operator, and whereby the work may be fed to the drill, or the drill to the work. In carrying out the invention, I provide a draw rod which is slidably mounted with respect to the drill casing and provided with a foot which extends in advance of the drill bit. This foot is normally pressed away from the drill bit by a spring and is movable toward the bit by a lever which is detachably and interchangeably connected to the drill casing and the draw rod in such manner that the handle of the lever may be extended at one side or the other of the casing, as desired, to suit the surroundings in which the drilling work is to be done. This lever, in conjunction with an interchangeable hand piece, which may be located at one side or the other of the drill casing, affords a convenient means for lifting and holding the drill as well as a means for moving the draw rod relatively to the drill to feed the work to the drill, or the drill to the work. The invention comprises other features of construction, the details of which will be plain from the following specification, taken in connection with the accompanying drawing, in which, Fig. 1 is a side elevation of a drill provided with my improvements;

Figure 1:
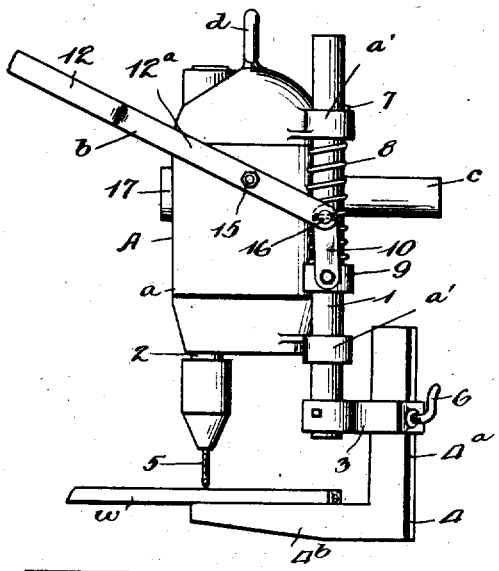

Referring to the drawing, A represents the drill, the casing *a* of which is provided with short laterally projecting ears or brackets *a'* at the top and bottom. These brackets are bored with alined openings and form guides for a draw rod 1, which extends parallel with the longitudinal axis of the drill spindle 2. A bracket 3 is removably secured to the lower end of the draw rod by a set screw $3^a$, and this bracket is angularly adjustable about the axis of the rod. The bracket projects laterally from the rod and has an elongated vertical slot or opening adapted to receive the arm $4^b$ of an L-shaped foot piece 4. The bracket holds this arm of the foot piece parallel with the axis of the drill, while the other arm $4^b$ extends at right angles to the axis of the drill. The bracket carries a clamping member 6 by which the arm $4^b$ can be clamped to the bracket and held in any desired position of adjustment with respect to the draw bar, or the foot can be removed when desired, by releasing the clamping member. The draw rod is prevented from turning by a key 7, fitting within the upper guide *a'* and engaging an extended guide slot in the rod.

Figure 2:
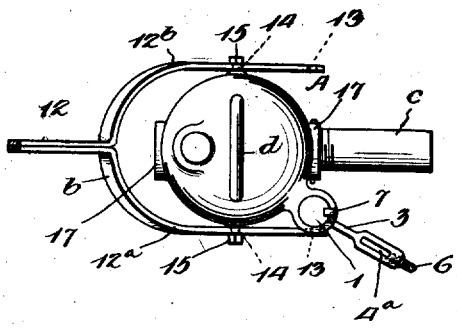
Fig. 2 is a top plan view of the same.
Figure 3:
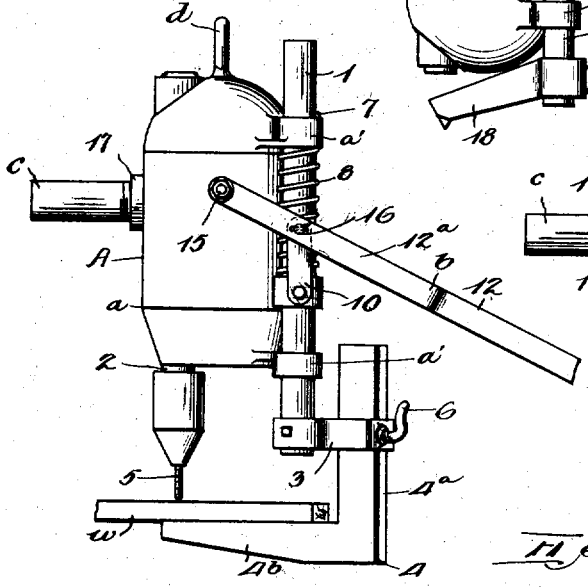
Fig. 3 is a view similar to that in Fig. 1, but showing the operating lever in the reverse position.
Figure 4:
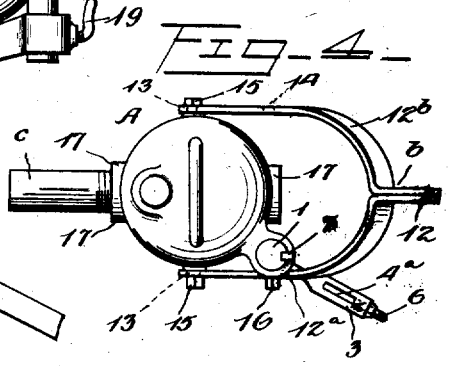
Fig. 4 is a top plan view of Fig. 3.

A compression spring 8, surrounding the draw rod and interposed between the upper guide *a'*, and a collar 9 on the rod normally tends to press the rod in the direction to move the foot away from the drill bit. For moving the draw rod in the opposite direction, I provide a link 10, which is pivoted to the collar by a bolt 11, which extends through the collar and engages the rod, and a forked lever *b*, which may be connected in different ways to the drill casing and link, as shown in the drawing. The lever comprises a handle portion 12 and two arms $12^a$ and $12^b$, the latter having near their free ends alined openings 13, and at equal distances from said openings other alined openings 14. The drill casing is provided at its opposite sides with bolts 15, which constitute trunnions upon which the forked arms of the lever may be pivoted, either by passing the bolts through the openings 14, as shown in Figs. 1 and 2, or through the openings 13, as shown in Figs. 3 and 4. When the lever is connected to the drill casing by passing the trunnions through the openings 14, the free end of one arm $12^a$ of the lever will be connected to the link 10 by a pivot pin 16, passing through the opening 13 in said arm, while the opening 13 in the opposite arm will have no function. When the lever is arranged in the reverse position with respect to the drill casing, as shown in Figs. 3 and 4, the trunnions will pass through the end openings in both arms and the link will be connected to one of the arms $12^a$ by passing of the pivot pin 16 through the opening 14 in said arm. The opening 14 in the other arm will then have no function.

The drill casing is provided with internally threaded bosses 17 at diametrically opposite points, and a hand-piece *c*, threaded at one end, is adapted to fit interchangeably into the openings in these bosses and to project radially to the axis of the drill spindle. The trunnions 15 project substantially at right angles to the axis of the openings in the bosses and the axis of the hand piece, and the lever 12 is thus pivoted to the casing on an axis substantially at right angles to a plane coinciding with the axis of the drill spindle and the rigid hand-piece. When the hand lever is connected so as to project at one side of the casing, the hand-piece *c* will be inserted in the boss at the opposite side of the casing so that the operator standing at the side of the drill may hold it with both hands, one hand gripping the hand piece and the other holding the lever. For working in some situations, it may be desirable to leave the hand-piece *c* off of the casing and use a hand grip *d*, which may be attached to the end of the casing.

Figure 5:
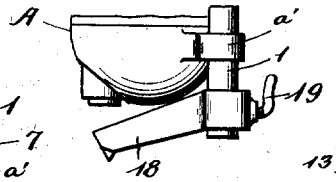
Fig. 5 is a detail of one end of the drill, inverted, showing an attachment which may be applied to the draw rod as a rest when boring upwardly.

In the operation of the drill, the lever will be connected to project at one side or the other of the casing, as may be found most expedient in applying the drill to the work. If the hand piece *c* is used, the operator takes hold of this or of the grip *d*, with one hand, and with the other hand grips the free end of the lever. The foot piece which is normally pressed away from the drill bit by the spring is then placed back of the work *w* and the drill is placed at the point where the hole is to be bored, and if the lever is connected, as shown in Figs. 1 and 2, the handle of the lever is pressed downwardly, or in the direction of the work, to move the draw rod and foot against the work. Continued movement of the lever will cause the draw rod and drill casing to move relatively to one another to feed the work to the drill, or the drill to the work. If the work is stationary, as is usually the case, bearing downward on both the lever and hand-piece will force the drill against the work. If the lever is connected as shown in Figs. 4 and 5, an upward pull on the lever will be required to cause relative movement of the draw rod and drill. When the lever is released, the compression spring 8 moves the draw rod in the direction to carry the foot away from the work and causes the lever to be returned to its initial position. The clamping engagement of the foot against the work helps to steady the drill and insures greater accuracy in boring than where the drill is merely held by the operator and fed to the work by the direct pressure of the operator's body.

In the operation of a portable drill, which is without a supporting stand, the operator must support the drill, hold it against turning about its axis when the bit is in engagement with the work, and also press the drill to the work. By means of my invention, the lever pivoted to the drill casing, and opposed to one of the grips or handles usually furnished as a part of the drill equipment, serves as a means for handling and supporting the drill, as a means for resisting the tendency of the drill to turn about the axis of its spindle, and also as a means for pressing the drill toward the work, or the work toward the drill.

By arranging the draw rod as close as practicable to the drill casing, and making it relatively short, a saving in weight is attained by shortening the guides or bearings in which the rod slides, and the weight and length of the forked arms of the operating lever is decreased, with increase of leverage. It is to be noted that the draw rod is out of line with the handles *c*, and close to the plane of one of the forked arms of the lever. The detachable foot, offset from the draw rod by the bracket 3, provides lateral clearance for the work, and permits of the draw rod being placed close to the drill casing and made relatively short. When the drill is used as a breast drill, the foot may be removed, thus further lightening the drill, or it may be swung about the axis of the rod, out of the way of the drill and the work, by loosening the set screw $3^a$.

Where it is desired to bore in an upward direction, an arm 18, Fig. 5, may be applied to the end of the draw rod, opposite the foot, to support the drill against a floor or other object. This arm may be secured to the rod by a clamping screw 19, and a conical projection $18^a$ on the arm, which bears against the floor or support, is in line with the axis of the drill spindle and serves as a means for causing the pressure on the drill to be applied axially of the spindle.

What I claim is:

1. The combination with a portable drill having a casing, of a handle rigidly secured to and projecting from one side of the casing, a lever pivoted to the casing on an axis substantially at right angles to a plane coinciding with the axis of the drill spindle and the rigid handle, a draw rod slidably mounted on the casing and connected to said lever, and a foot mounted on the draw rod.

2. The combination with a portable drill having a casing, of a hand lever having parallel arms pivoted to opposite sides of the casing, a draw rod slidably mounted on said casing adjacent the plane of one of said arms, and a link connecting said rod with the latter arm whereby the pivoting may be interchangeable between the casing and the link.

3. The combination with a portable drill having a casing, said casing having means at its opposite sides for receiving a detachable handle, of a hand lever having forked arms pivotally connected to opposite sides of the casing upon an axis substantially at right angles to the axis of said means, a draw rod slidably mounted on the casing, and a link connecting said rod with one of said arms.

4. The combination with a portable drill having a casing, of a draw rod slidably mounted close to said casing and extending parallel with the axis of the drill spindle, a bracket projecting laterally from the lower end of said draw rod, an L-shaped foot having an arm adjustably secured in the outer part of said bracket and extending parallel with the draw rod, and a lever pivoted to the side of the drill casing and connected to said rod for moving the latter relatively to the drill.

In testimony whereof I affix my signature.

HENRY WALTER GRAU.